July 19, 1960

C. R. BELL 2,945,647

AUTOMATIC PILOT SYSTEM

Filed May 18, 1953

INVENTOR.
CHARLES R. BELL
BY
Oscar B. Brumback
ATTORNEY

July 19, 1960
C. R. BELL
2,945,647
AUTOMATIC PILOT SYSTEM
Filed May 18, 1953
3 Sheets-Sheet 2
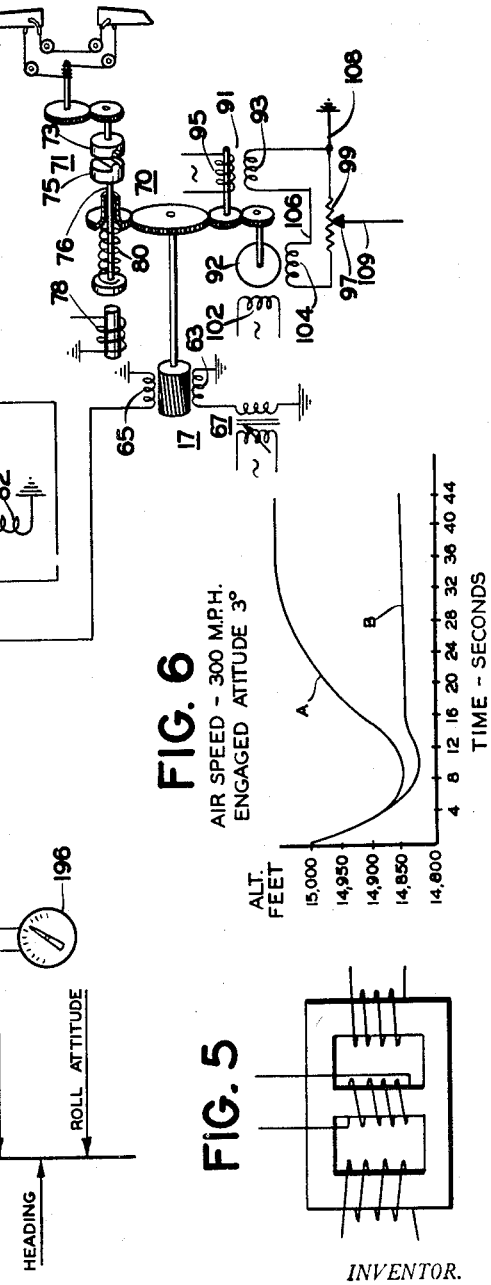
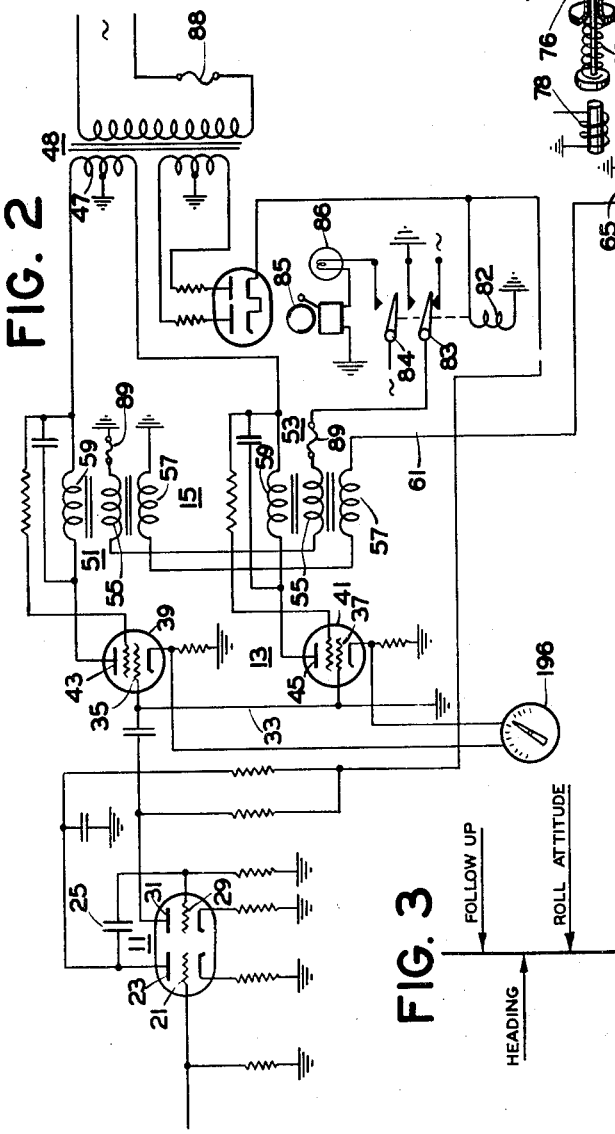
INVENTOR.
CHARLES R. BELL
BY
Oscar B. Brumback
ATTORNEY

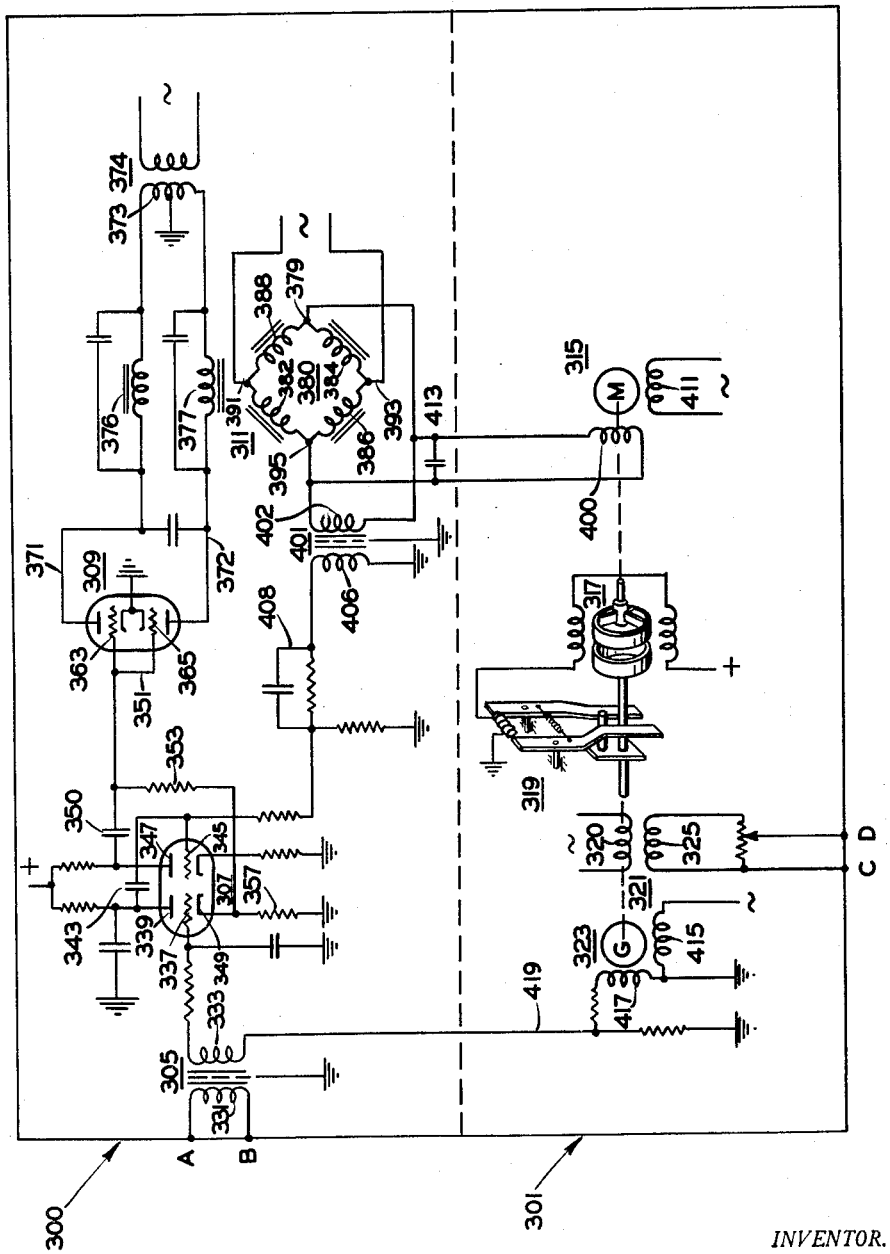

United States Patent Office 2,945,647
Patented July 19, 1960

2,945,647
AUTOMATIC PILOT SYSTEM

Charles R. Bell, Bergenfield, N.J., assignor to Bendix Aviation Corporation, Teterboro, N.J., a corporation of Delaware Filed May 18, 1953, Ser. No. 355,812
33 Claims. (Cl. 244—77)

This invention relates generally to automatic control systems and, more particularly, to steering systems for automatically maintaining a craft in a desired position and attitude.

Reference devices for automatic polit systems are generally of two types: those which indicate the position of a craft with respect to a desired line of flight and those which indicate the attitude of the craft with respect to a predetermined attitude. Heretofore known automatic steering systems through the actions of a compass or directional gyroscope on the ailerons or rudder automatically maintained the craft on a predetermined heading and through the action of an altitude control maintained the craft at a desired altitude. Disadvantages were experienced with these systems, however, because the control channels included other reference devices such as attitude references for controlling conditions of the craft besides its position; the altitude and heading control signals were frequently balanced by the pitch and roll attitude signals, respectively, and either the craft was not maintained on the desired heading or at the desired altitude or else a continuous error control effect was developed by the reference device to keep the craft at the reference position.

An object of the present device, therefore, is to provide a novel means for maintaining a craft on a desired reference.

Another object is to provide a novel means for eliminating the error signal required by a reference device for balancing other reference devices in an automatic steering system to maintain a craft on a predetermined reference.

A further object is to provide an aircraft automatic pilot system which has position responsive reference devices, such as a compass or altimeter, with a novel means for correcting the constant signal error required to maintain the craft on a reference.

Still another object of the invention is to provide a means for smoothing the control of a craft by an automatic pilot system.

A further object is to provide a novel means for changing the craft from one reference position, such as heading or altitude, to another position by smooth transitions from one attitude to another.

A still further object is to provide a novel means for automatically maintaining a craft on an exact positional reference, such as heading or altitude, with zero error from the reference device regardless of the initial conditions at the instant of engagement of the automatic steering system.

The above and further objects and novel features of the invention will appear more fully hereinafter from a consideration of the detailed description which follows, taken together with the accompanying drawings wherein an embodiment of the invention is illustrated. It is to be understood, however, that the drawings are for the purposes of illustration and description only, and are not to be construed as defining the limits of the invention.

In the drawings wherein like reference numbers refer to like parts:

Figure 2 shows a detailed schematic diagram of the servoamplifier, servomotor, follow-up and rate generators shown in block form in Figure 1;

Figure 3 shows vectorially the manner in which the heading signal balances the roll attitude and follow-up signals;

Figure 4 shows a complete schematic diagram of the integrator shown in block form in Figure 1;

Figure 5 shows a schematic illustration of a saturable reactor of the integrator shown in Figure 4; and Figure 6 shows graphically the manner in which the vertical flight path (A) of an aircraft controlled by the novel automatic pilot system of Figure 1 differs from the flight path (B) of an aircraft controlled by an automatic pilot system with conventional altitude control.

Figure 1:
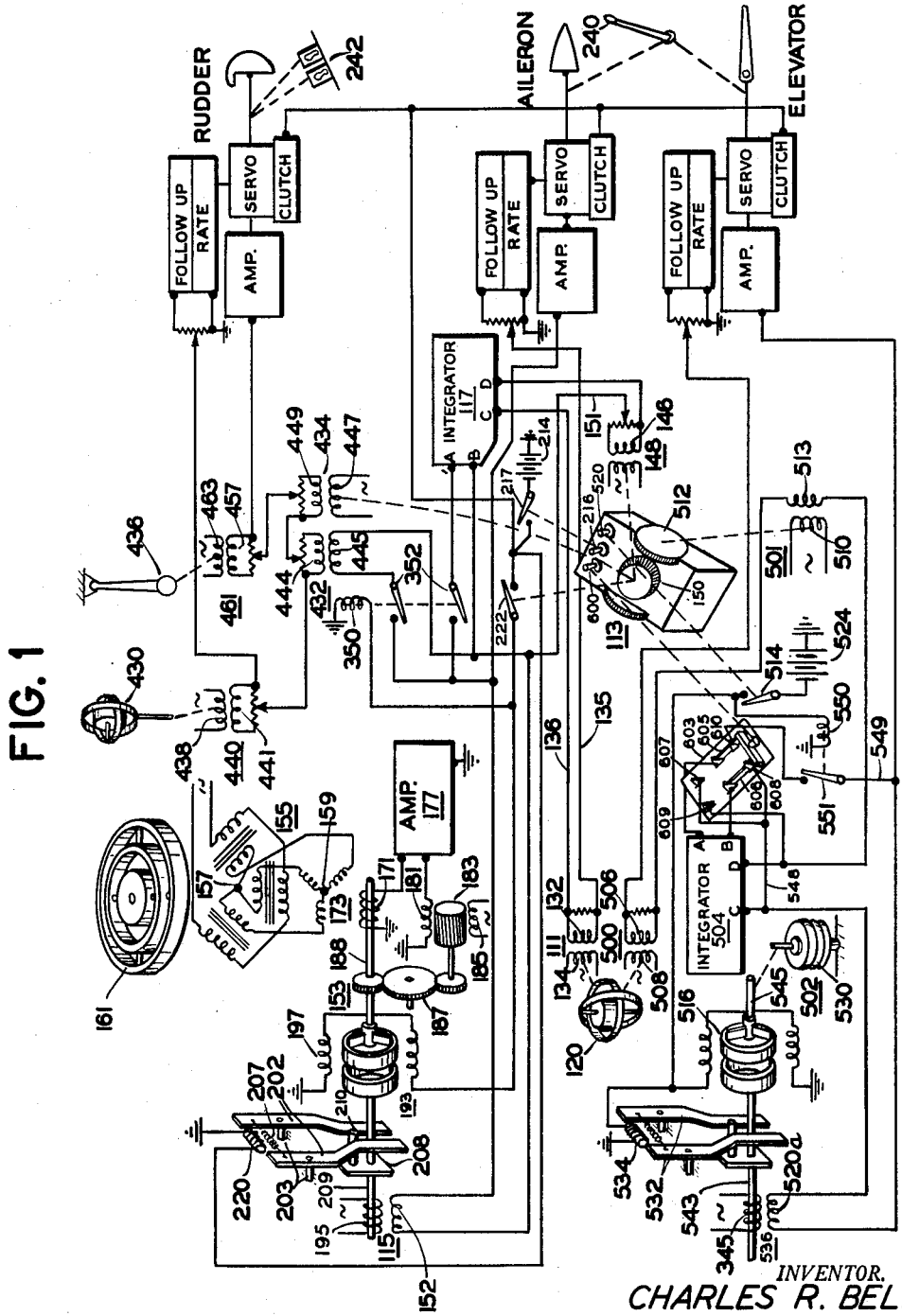
Figure 1 shows a complete schematic wiring diagram of the novel automatic pilot system of the present invention.

An automatic pilot system detects the deviations of a craft from a reference and applies a suitable control action on the craft to keep it in a particular attitude and at a selected altitude and heading. This reference, for example, may be the inertia of a gyroscope, the magnetic field of the earth, the pressure of the atmosphere, or a radio beam. Sensing devices in the automatic pilot system respond to deviations from the reference and develop signals to control the craft about each of its axes; a series of these signals being algebraically combined and applied to a servoamplifier where the signal is amplified and the direction of deviation determined by the phase of the signal. In response to the amplifier output, a servomotor transforms the electrical energy into mechanical motion to move the surface to bring the craft back to the reference.

The servomotors and servoamplifiers for each control channel of the automatic pilot system may be identical, being shown in block form in Figure 1 and in detail in Figure 2. Referring to Figure 2, the servoamplifier consists generally of a preamplifier 11, a discriminator 13, and a magnetic amplifier 15. The servomotor 17 may be a conventional two-phase induction motor.

Preamplifier 11 may be a vacuum tube of the twin triode tube type for giving the signal two stages of amplification: a signal applied to grid 21 of amplifier 11 receives one stage and the signal from plate 23 is applied through a blocking condenser 25 to grid 29 for a second stage. The output from plate 31 is impressed on a lead 33 which interconnects grids 35 and 37 of a pair of vacuum tubes 39 and 41 that form a conventional phase discriminator 13.

So that discriminator 13 may detect the direction of a condition causing the control signal by the phase of the signal, its plates 43 and 45 are energized from the opposite ends of a center-tapped secondary winding 47 of a power transformer 48. Thus, while the excitation of plate 43 is opposite in phase to the excitation of plate 45, the phase of the signal on grids 35 and 37 is the same because of their interconnection by lead 33. Therefore, only one tube will conduct or develop an output at any instant because only one tube has the signal on its grid and the excitation of its associated plate in phase at that time. The output of discriminator 13 is applied to magnetic amplifier 15.

Magnetic amplifier 15 consists generally of two saturable transformers 51 and 53. Each transformer has three windings: a primary winding 55 connected to a source of alternating current; a secondary winding 57 connected to a field winding 65 of servomotor 17; and a control winding 59 connected to a plate of the discriminator 13 and secondary winding 47 of transformer 48.

Secondary windings 57 of the transformers are connected in series opposition and are balanced.

Magnetic amplifier 15 has no output when no signal appears at the grids of discriminator 13 because the voltages induced in windings 57 cancel out. An output does appear, however, when a signal is applied to the grids of discriminator 13 since the output of plate 43 or 45 of the discriminator at this time energizes one control winding 59, tending to magnetize the core of its transformer by an amount corresponding to the energization. The induction of the secondary winding of this transformer from the primary winding is reduced, upsetting the balanced relationship of the secondary windings. The output of the transformer whose control winding is not energized is, therefore, greater; and a resultant output develops in lead 61. The magnetization of one transformer core occurs for a signal of one phase and the other core for a signal of another phase. Since the phase of the signal depends upon the direction of deviation from the reference, the magnetization of one core develops for a deviation in one direction and of the other core for a deviation in the other direction. The resultant signal is sent to the servomotor 17.

Servomotor 17 has two field windings: a fixed phase winding 63 energized by a suitable source of alternating current; and variable phase winding 65 energized by the magnetic amplifier signal. A variable transformer 67 controls the strength of the field of winding 63 and, therefore, the maximum torque developed by servomotor 17. This is desirable so that in case of emergency the human pilot can overcome the operation of the motor on the surface by operating a conventional manual control. The excitation fields of the two motor windings are displaced by ninety degrees; the signal which appears in lead 61 developing a field in the variable phase winding which leads or lags by ninety degrees the phase of the fixed phase winding, depending upon which control winding of the magnetic amplifier is energized. Thus, the magnetic amplifier output determines whether servomotor 17 will rotate in a clockwise or counterclockwise direction.

Servomotor 17 drives the control surface through a suitable gear train 70 to the position ordered by the command signal. This gear train 70 includes a solenoid operated clutch 71. Shaft 76 is moved in one direction when a solenoid 78 is energized to engage the two clutch faces 73, 75, and in an opposite direction by a spring 80 when the solenoid is deenergized to disengage the clutch.

As a monitor for the amplifier, a relay 82 is connected in parallel with the plate supply of preamplifier 11. When the plate supply fails, relay 82 is deenergized and armatures 83 and 84 move upwardly to cut off the excitation of the magnetic amplifier 15 and operate suitable warning bells 85 and lights 86. As a further protective measure, the excitation is also cut off when the transformers reach a temperature sufficient to melt the thermal fuses 88 and 89.

A follow-up device 91 and a rate generator 92 damp the action of the surface to prevent oscillation and hunting. Follow-up device 91 measures the magnitude of the displacement of the surface from its normal streamlined position and develops a corresponding signal so that the displacement will correspond to the correction called for by the reference signal. Rate generator 92 measures the rate of rotation of motor 17 and develops a corresponding signal to prevent the motor from overrunning the assigned position because of the inertia stored as kinetic energy in the moving parts.

Follow-up device 91 is an inductive signal generator having a stator 93 and a rotor 95. The stator is fixed and the relatively movable rotor 95 is geared to servomotor 17. Normally, rotor 95 is at a null position relative to stator 93 so no signal is developed in the stator. Since the operation of motor 17 moves the surface, the displacement of rotor 95 corresponds to the movement of the surface. The signal developed in stator 93 is algebraically combined with the reference signal; the follow-up signal and reference signal being in phase opposition.

The servomotor displaces the control surface in response to a command signal until the signal developed by follow-up device 91 is equal and opposite to the command signal, at which time the servomotor stops operating. Tap 97 of potentiometer 99 adjusts the relative strength of the follow-up signal to give the desired control action for a given command signal: the smaller the follow-up signal strength for a given deflection of the control surface, the greater deflection a given command signal will impart to the control surface; conversely, the greater the follow-up signal strength, the smaller will be the surface deflection for a given command signal.

Rate generator 92 is a conventional type, having two field windings: one winding 102 is continuously energized; and the other winding 104 develops a signal when the rotor of the generator is turned, the signal corresponding to the speed of rotation of the rotor. Since the rotor is geared to servomotor 17, its rotation corresponds to the rotation of the servomotor.

Potentiometer 99 and a lead 106 connect stator 93 of follow-up device 91 and winding 104 of rate generator 92 to form a series circuit. Grid 21 of amplifier 11 recognizes a change in voltage relative to ground. Therefore, lead 108 grounds one end of potentiometer 97, and lead 109 connects the rate and follow-up signal with the signals of other reference devices to form a series signal combination which constitutes the input signal to the servoamplifier. A series of different reference devices forms the signal chain for each control channel.

Considering the roll control channel for controlling the ailerons and referring to Figure 1, the signal chain from ground to grid 21 of the aileron servoamplifier includes a follow-up device, a rate generator, a bank reference device 111, an inductive device 148 of a manual control device 113, a heading control device 115, and an integrating device 117.

The bank reference or roll attitude reference may be provided by a conventional vertical gyro 120 in which a rotor spins about a normally vertical axis that is mounted in a gimbal frame for oscillation about two mutually perpendicular axes: one axis corresponding to the roll axis of the craft and the other corresponding to its pitch axis. Characteristics of the gyroscope constrain it to maintain its position in space despite oscillations of the craft so displacement of the aircraft about its pitch and roll axis can be readily measured. A conventional erecting mechanism (not shown) keeps the rotor axis of the gyro approximately vertical.

Inductive device 111 for generating the bank attitude signal has a fixed stator 132 and a relatively movable rotor 134. Due to mechanical connections between the rotor and the roll axis of the gyro, displacement of the craft about the roll axis correspondingly displaces rotor 134 relative to stator 132 to develop a signal whose amplitude and phase corresponds to the magnitude and direction of the banked condition, respectively, with regard to a predetermined bank attitude.

A lead 135 connects one end of stator 132 to the tap of the potentiometer across the rate generator and follow-up devices of the aileron, and a lead 136 connects the other end through terminals C and D of integrating device 117 to a stator 146 of an inductive device 148 in manual controller 113. When this integrator is not operative, terminals C and D act as ordinary connecting leads in the signal chain.

Manual controller 113 permits the human pilot to maneuver the aircraft through the automatic pilot system while the system is in control of the craft and may be generally of the type disclosed in Patent No. 2,659,554 inssued November 17, 1953, and assigned to the assignee of the present invention. The inductive devices of this controller have their rotors normally in a null position with respect to their stators so that no signal is fed into the signal chain. Suitable mechanical connections connect the rotors of the inductive devices which are in the roll and yaw channels with a knob 150 so that as knob 150 is turned, the rotors are turned a sufficient amount relative to their stators to produce signals to turn the craft. These signals actuate the aileron servomotor to move the ailerons to bank the craft, and the rudder servomotor to move the rudder to coordinate the turn. In the bank channel, one end of the stator 146 is connected to inductive device 111 and the other end is connected by lead 151 to the stator 152 of a signal transmitter 115 in the heading control.

The heading control operates in connection with an earth inductor compass to provide a directional signal. As is well known, an element 155 in the compass is comprised of three saturable pick-ups arranged in the form of a triangle: each pick-up having a saturating winding and a measuring winding. The saturating windings are connected in series to a suitable source of alternating current while each measuring winding is connected at one end to a common junction 157 and at the other end to one winding of a three phase stator 159. A conventional gyro 161 maintains the compass element in a horizontal plane so that it will respond to the horizontal component of the earth's magnetic field.

The directional signal is reproduced in the stator 159 of an inductive device 173 and the resulting signal induced in rotor 171 is applied to an amplifier 177. The output of the amplifier 177 energizes the variable phase winding 181 of a two-phase motor 183 whose fixed phase winding 185 is energized by a source of alternating current. In response to the signal, motor 183 drives a shaft 188 to position rotor winding 171 relative to stator 159 so that the signal becomes null. Through a magnetic clutch 193, motor 183 at the same time drives a rotor 195 which with stator 152 forms inductive signal developing device 115; this device generates a signal representing the deviation of the craft from a selected heading.

When a coil 197 is not energized the faces of clutch 193 are not engaged, and a pair of centering levers 202 maintain rotor 195 at its null position relative to stator 152. These centering levers pivot on pins 203 and are urged together by a tension spring 207. A plate 208 on shaft 209 has a pin 210 which projects between levers 202. The clutch is engaged, when solenoid 78 is energized to engage clutches 71 which connect the servomotors with the surfaces of the aircraft; the clutches for the servomotor and the clutch for the heading control being connected in parallel with a power source such as battery 214. Closing the circuit from the battery to the clutches by lever 216 on controller 113 operating armature 217 engages the automatic pilot system with the aircraft and inserts the heading signal into the automatic pilot system. When clutch 193 is engaged and shaft 209 is turned, pin 210 urges one lever 202 outwardly against the tension of the spring 207 which returns the lever and pin 210 to its central position when the clutch is disengaged. To prevent the centering action from occurring until after the automatic pilot system is deenergized, another solenoid 220 maintains the levers in expanded position upon the energization of a solenoid 220 once the automatic pilot is engaged.

To render the compass ineffective on the automatic pilot system when the knob 150 is turned so that it will not interfere with the turning of the craft, a mechanical connection between knob 150 and a switch 222 opens the circuit to clutch 193 upon a turning of the knob. This disengages the clutch faces, and rotor 195 of inductive device 115 does not turn as the compass follows the turning of the craft. Switch 222 closes when knob 150 is centered; clutch 193 is again energized; and the automatic pilot system maintains the craft on the new heading. Connecting stator 152 to the grid of a preamplifier in the aileron servoamplifier completes the signal chain.

The operation of the aileron signal channel thus far described is as follows:

When external forces bank the aircraft, the displacement of rotor 134 relative to stator 132 of inductive device 111 develops a signal corresponding in phase and amplitude to the direction and extent of banking. This signal is amplified and its phase detected in the aileron servoamplifier where one of the transformers of the magnetic amplifier tends to become saturated, resulting in a signal which energizes the variable phase winding of the servomotor. The servomotor moves the ailerons in a direction to correct the banked condition.

The displacement of the ailerons from their normal position develops a signal in the aileron follow-up, the signal increasing until it becomes equal and opposite to the attitude reference signal from inductive device 111. At this time, the net signal input to the aileron servoamplifier is zero so the servomotor stops. As the displaced position of the surface returns the craft to the predetermined attitude, however, the bank attitude signal diminishes and the follow-up signal prevails. The follow-up signal, being opposite in phase to the attitude signal, drives the servomotor in a reverse direction to return the surface to its normal streamlined position. As the craft reaches its predetermined attitude, the follow-up signal and bank attitude signal will have become zero and the surfaces will have been returned to their streamlined position.

The bank attitude of an aircraft controls its heading since an aircraft turns in the direction of its lowered wing. Should gusts or other external disturbances result in the craft being displaced from its course, the corresponding signal which develops in inductive device 115 in the heading control actuates the aileron servomotor to move the ailerons to roll the aircraft in a direction to correct this heading. As a result, the signal from inductive device 115 in the heading control and the signal from the bank attitude inductive device 111 on the vertical gyro are in opposition: the heading control tending to bank the craft to return the craft to its predetermined heading and the bank reference device on the vertical gyro tending to oppose any change in bank attitude. This balancing action of the attitude signal and the heading signal will become more apparent as the manual operation of the craft is discussed.

A human pilot may disengage the automatic pilot system and control the craft manually by moving the conventional manual control column 240 or rudder pedals 242. Although the automatic pilot system is disengaged from the surface at this time, it is continuously being conditioned so as to maintain the craft in its attitude at the instant of engagement. To control the craft manually the human pilot operates lever 216 to open switch 217 deenergizing clutch 71. The aileron servomotor now can operate freely without moving the ailerons. As the human pilot banks the craft, the corresponding attitude signal which develops in inductive device 111 will cause the aileron servomotor to run until the rotor of the aileron follow-up device has been displaced sufficiently to develop a signal equal and opposite to the attitude signal; the net signal input to the servomotor will be zero; and the servomotor will stop with the rotor of the follow-up displaced from null. Since clutch 193 of the heading control is also disengaged at this time, motor 183 does not displace rotor 195 of inductive device 115 as it drives rotor 171 to a null position relative to stator 168 in following the heading of the aircraft.

The human pilot may engage the automatic pilot system even though a wing is low or the craft is in a turn by actuating lever 216, thereby moving switch 217 to a closed position. This energizes solenoid 78 and coil 197 to engage clutches 71 and 193 respectively; clutch 71 connecting the servomotor to the surface, and clutch 193 connecting shaft 209 of the directional control with drive shaft 188. As the lowered wing condition turns the aircraft off its heading, the heading error signal which develops in signal generator 115 orders an aileron correction. The wings are leveled, and the automatic pilot maintains the aircraft on a fixed heading.

The heading error in inductive device 115 has not been corrected, however. If the craft was out of trim when the automatic pilot system was engaged, a constant error signal must be maintained to keep the wings level. As a result, the signal at the input of the aileron servoamplifier consists of an algebraic sum of the bank attitude signal from inductive device 111 which is now zero, the signal from the aileron follow-up, and the heading signal from signal generator 115. Since the normal position of the servomotor in this case has been established as the position when a wing is lowered, the aileron servomotor must exert a constant torque to keep the wings level.

A conventional trim indicator 196, Figure 2, connected across the cathodes of the discriminator in the servoamplifier will show a sustained off center displacement calling for manual aileron trim to center the indicator. The manual trim relieves the servomotor from exerting a sustained torque.

Should the automatic pilot be engaged while the aircraft is out of trim in roll or in a continuous turn and the human pilot not make the manual trim adjustment, a sudden action on the craft would be experienced when the human pilot turns the craft with manual controller 113 because the moving of knob 150 from center position moves switch 222, deenergizes clutch 193, and frees rotor shaft 209 of drive shaft 188. Should the centering levers 202 return rotor 195 to a center position relative to stator 152, the aileron servomotor would be driven to a null, dropping the wing to the position it had at the time the automatic pilot system was engaged with the craft. To prevent the craft from returning to its initial attitude, solenoid 220 holds centering levers 202 apart so rotor 195 does not change position when a controller turn disengages the compass control. Maintaining this heading error in the automatic pilot system avoids an abrupt fall of the wing.

Integrator 117 overcomes the condition described above in which a constant error signal is maintained in the heading control to balance the attitude and follow-up signals. This integrator, being connected at terminals A and B across the heading reference signal generating device 152 in parallel with the aileron signal chain, responds to the heading error signal to develop a signal that is a function of the error signal. With this signal automatically adjusting the roll attitude, the automatic pilot system can quickly and accurately maintain the engaged heading even though the system has been engaged when the craft was in a turn or had one wing down. The heading is also maintained although the trim condition may change materially during flight as, for example, should a propeller be feathered.

The details of integrator 117 and 504 are identical; therefore, only one will be discussed in detail. Referring to Figure 4, the integrator is comprised generally of an electrical assembly 300 and a mechanical assembly 301. The electrical assembly includes a coupling transformer 305, a preamplifier 307, a discriminator 309, and a magnetic amplifier 311. The mechanical assembly includes a motor 315, a magentic clutch 317, a centering device 319, an inductive signal generating device 321, and a rate generator 323.

The error signal from inductive device 115 is impressed across terminals A, B, and after being amplified by preamplifier 307 and detected as to phase by discriminator 309, operates motor 315 that drives the rotor 320 of inductive device 321. By the use of rate generator 323, the operation of the motor is made linear with input voltage so that the output from the stator 325 of the inductive device at terminals C and D becomes the integral of the input error voltage at terminals A and B.

Considering now the details of the integrator, the signal applied to terminals A and B and appearing on primary winding 331 of coupling transformer 305 induces a signal on secondary winding 333. This signal is applied to grid 337 of twin triode preamplifier 307 for a first stage of amplification, and the signal from plate 339 is applied through a blocking condenser 343 to grid 345 for a second stage. The output signal from plate 347 of amplifier 307 passes through a blocking condenser 350 where a portion is applied to a lead 351 and a portion, as determined by the relative values of resistors 353 and 357 is fed back to cathode 349. This negative feedback maintains the gain of preamplifier 307 relatively constant.

Lead 351 interconnects the grids 363 and 365 of a twin triode 309 which constitutes a conventional phase discriminator. Grids 363 and 365 are so biased that normally substantially equal currents flow through the leads 371 and 372 which are connected to the opposite ends of a center-tapped secondary winding 373 of transformer 374. An error signal applied to grids 363 and 365 upsets the normally balanced condition of these plate currents by an amount depending upon the amplitude of the signal and in a direction depending upon the phase of the signal. Leads 371 and 372 include the control windings 376 and 377 of magnetic amplifier 311.

Magnetic amplifier 311 consists of two saturable core reactors. As shown in Figure 5, each reactor is comprised of a conventional three-legged core whose center leg carries the direct current control winding and whose outer legs carry a winding energized by alternating current. Each outer winding constitutes an arm of a normally balanced bridge network 380: outer windings 382 and 384 of the reactor associated with control winding 376 forming one pair of diagonally opposed arms of the bridge, and outer windings 386 and 388 associated with control winding 377 forming the other pair.

Although an alternating current is applied to terminals 391 and 393 of bridge 380, the normal output from terminals 395 and 397 is zero; the equal currents flowing through the control windings magnetize each reactor core equally so the impedance of each arm is identical and the bridge is balanced. The appearance of a signal on grids 363 and 365 of discriminator 309 unbalances the control winding currents, magnetizing one core to a greater extent and the other core to a lesser extent. Therefore, the impedance of one diagonally opposed pair of windings decreases while the impedance of the other pair increases. The resulting unbalanced output at terminals 395 and 379 energizes the variable phase winding 400 of the two-phase motor 315.

A portion of the output of the magnetic amplifier also feeds back by way of a coupling transformer 401 to the input of the second stage of preamplifier 307 to stabilize it against a drift from the balanced condition caused by the aging of tubes or circuit components after the initial balancing adjustments. Primary winding 402 of coupling transformer 401 is connected across terminals 395 and 379 in parallel with the variable phase winding 400 of the servomotor, and secondary winding 406 is connected through a capacitance and resistance phase changing device 408 to the grid 345 of preamplifier 307.

Connecting the variable phase winding 400 of motor 315 across terminals 395 and 379 completes a circuit for the flow of current from the magnetic amplifier 311. When a signal appears at discriminator 309, a greater current will flow through the opposite pair of low impedance windings of the magnetic amplifier than through the opposite pair of high impedance windings. Unbalancing the control windings in an opposite direction reverses the phase of the current flowing through the motor. Since the direction of rotation of the motor depends upon the phase of the excitation of winding 400 with respect to the phase of winding 411, a reversal of rotation occurs when the input signal reverses phase. A capacitor 413 across the variable phase windings maintains the substantially quadrature relationship between the fixed and variable phase windings that is necessary for maximum efficiency of the motor.

Rate generator 323 is a conventional type having two field windings: winding 415 is continuously energized; and when the rotor is turned, a voltage is induced in winding 417. This voltage is proportional to the speed of revolution and, accordingly, to the speed of motor 315. By way of lead 419 this voltage is added algebraically with the input signal at coupling transformer 305 so that the response of the integrator will depend upon the inverse characteristic of the rate generator. Since the voltage from the rate generator varies directly and substantially linearly with the speed of rotation, the operation of the integrator motor varies substantially linearly with the signal input at transformer 305.

Inductive device 321 has a rotor 320 mechanically connected for displacement by motor 315; the connection including a magnetic clutch 317. When the clutch is disengaged, a centering mechanism 319 maintains rotor 320 in a null position relative to its stator 325. The clutch is energized by suitable means (not shown) from battery 214 when armature 217 is in a closed circuit position. This engages the clutch faces. Since the ouput of the inductive device 321 corresponds to the extent of operation of the two-phase motor which, in turn, varies linearly with the input signal, the signal output of the inductive device is the integral of the input signal. The signal from the stator of the inductive device is connected in series in the signal chain by way of terminals C and D.

A relay 350, connected in parallel with the circuit to magnetic clutch 193 of the heading control, keeps the integrator from operating when a turn is made with controller 113. When the clutch is energized, armatures 352 are in a closed circuit position and integrator 117 can operate from the heading error; but when the clutch is deenergized as in making a turn with knob 150, relay 350 is also deenergized thereby opening the input circuit to terminals A and B of integrator 117 and the integrator will not operate.

Considering now the yaw control channel, the rudder servomotor, servoamplifier, rate generator, and follow-up device may be identical to those discussed above. The signal chain from the ground lead to the grid of the servoamplifier includes a follow-up, a rate generator, a rate of turn device 430, a coupling transformer 432, an inductive device 434 of manual controller 113, and a dynamic vertical sensor 436.

In the yaw control channel signal chain, a signal is taken from the tap across the potentiometer of the series connected rudder rate generator and follow-up and is applied to the potentiometer across rate of turn device 430. This may be a conventional rate gyroscope which responds to the rate of turning of the aircraft about its yaw axis and displaces a rotor 438 of an inductive device 440 relative to a stator 441 to develop a corresponding signal. This signal is combined with the follow-up and rate generator signals applied across the secondary winding 444 of the coupling transformer 432 where the directional signal from the heading control 115 is applied to the rudder control channel as well as the aileron channel.

Although the heading of the aircraft is controlled largely by the ailerons because of the greater efficiency achieved in turning the craft with ailerons than with rudder, still a corresponding rudder action is desirable to coordinate the turning. To this end, the primary winding 445 of coupling transformer 432 is connected across the heading signal developing device in parallel with the aileron signal chain so that a corresponding signal is induced in the secondary winding 444 which is connected in the signal chain in series with inductive device 434 of the manual controller 113.

Normally, the rotor 447 of inductive device 434 of controller 113 is at a null position relative to its stator 449. However, when the human pilot turns knob 150 to turn the craft, rotor 447 is displaced to develop a signal in stator 449 in the yaw channel to coordinate the turning; the stator being connected in series with a stator 457 of dynamic vertical sensor 436 which is a "slip-skid" detector.

Since manual controller 113 is adjusted to provide a coordinated turn at one airspeed, slipping or skidding occurs when the craft is turned while the airspeed is different than the airspeed for which the controller is adjusted. Dynamic vertical sensor 436 corrects this condition with an appropriate signal to the rudder servomotor. During a coordinated turn of the craft, i.e., with no skidding or slipping, the normal vertical and the dynamic vertical of the aircraft coincide. However, when slipping or skidding occurs, the normal vertical and the dynamic vertical are displaced. The dynamic vertical sensor, which may employ a damped pendulum, develops a signal corresponding to this displacement. In coordinated turns, the pendulum remains centered because of the resultant of the forces acting on the pendulum. If the aircraft skids or slips, however, the resultant of the forces acting on the pendulum displaces it from its normally centered position by an amount corresponding to the difference between the true vertical of the craft and the dynamic vertical. Rotor 463 of inductive device 461 is connected to the pendulum and is displaced relative to the stator 451 by an amount corresponding to the angle between the normal vertical of the craft and dynamic vertical to develop a signal in the stator 457 for operating the rudder servomotor to coordinate the turning.

The reference devices for the pitch channel of the craft include follow-up device, a rate generator, a pitch takeoff 500 on the vertical gyro, an inductive device 501 in manual controller 113, an altitude control 502 and an integrating device 504. The servoamplifier, servomotor, rate generator, and follow-up may be identical to those previously described.

The signal from the potentiometer across the pitch rate generator and follow-up device is connected to the stator 506 of an inductive device 500 whose rotor 508 is mechanically connected to the pitch axis of vertical gyro 120 for displacement relative to stator 506 to develop a signal corresponding to the displacement of the craft from a predetermined pitch attitude. The stator is connected in series with a stator 513 in manual controller 113.

When the altitude control is not engaged, the turning of wheels 512 displaces rotor 510 relative to stator 513 to develop a signal at will for changing the pitch attitude of the craft. To do this, a switch 514 must be opened so that a magnetic clutch 516 in altitude control 502 will be deenergized to keep the altitude control from opposing the pitch attitude.

Updrafts or downdrafts frequently change the altitude of a craft without causing a corresponding change in the attitude of the craft. To maintain the craft at a desired altitude, the closing of switch 514 by moving lever 520 on controller 113 engages an altitude control 502 by energizing magnetic clutch 516; thereafter the altitude control produces a signal for altitude correction upon any deviation of the craft from the reference altitude. This altitude control may be of the type described in U.S. Patent No. 2,512,902 issued June 27, 1950 to H. F. S. Rossire and consists of an aneroid 530, a centering mechanism 532 with a holding solenoid 534, an inductive signal developing device 536, and a motion transmission including shaft 545 connected to the aneroid and the shaft 543 supporting the rotor 545 of inductive device 536. One end of shaft 543 is connected to magnetic clutch 516 through the centering arms of centering device 532.

With the altitude control lever at an "off" position, switch 514 is open and clutch 516 and solenoid 534 are deenergized. Shaft 543 is disengaged from the shaft 545, and the aneroid responds freely to changes in altitude without moving rotor 545 of inductive device 536. When the human pilot moves the altitude control lever 520 to an "on" position clutch 516 is energized, and inductive device 536 is directly connected to aneroid 530. In addition, the solenoid 534 opens centering levers 532 to free shaft 543 for rotation. Movement of the aneroid in response to a departure of the craft from the reference altitude correspondingly moves the rotor 545 of inductive device 536 to develop a signal which causes the elevators to be moved to return the craft to the reference altitude. The altitude signal becomes zero as the craft returns to the reference altitude, and the elevator follow-up device returns the elevators to their streamline position.

Should the craft experience a change in altitude without a corresponding change in attitude, the altitude control and the vertical gyro may at times be working in opposition. The altitude signal that develops in inductive device 536 due to a change in altitude actuates the elevator servomotor to displace the elevators. The displacement of the elevators continues until the follow-up signal resulting from the surface displacement becomes equal and opposite to the altitude signal whereupon the servomotor stops. The elevator displacement places the craft in a climb or dive attitude, and an attitude signal develops in pitch attitude signal device 500 on the vertical gyro. This attitude signal is in opposition to the altitude signal; and as the attitude signal balances the altitude signal, the follow-up signal operates the servomotor to bring the elevators back to their normal streamline position. The result is that an equilibrium condition may be reached where the errors in attitude and in altitude balance out even though the craft is not flying at the precise reference altitude and is not in the precise reference attitude.

A balanced condition may also occur when the altitude control is engaged while the aircraft is at some attitude other than straight and level flight. One of the features of the novel automatic pilot system, as previously discussed, is that the automatic pilot system may be engaged with the aircraft at any attitude because the automatic pilot system is always synchronized with the attitude of the craft. This synchronization results from the follow-up device being connected with the servomotor when the servomotor is free of the surface. At any time after taking the craft off the landing field, the human pilot may engage the automatic pilot system. The signal developed by the pitch take-off of the vertical gyro if the aircraft is not in its normal level attitude will have driven the elevator servomotor until the follow-up signal is equal and opposite to the pitch attitude signal. The human pilot can move lever 216 to actuate the engage switch 217, and the automatic pilot will maintain the aircraft in the attitude which it was in at the instant lever 216 is moved until the automatic pilot system is disengaged.

With integrator device 504 in the system, the human pilot can engage the altitude control 502 when the aircraft has attained the altitude desired even though the aircraft is climbing or diving because the altitude integrator will provide a signal to level the airplane in pitch at the reference altitude quickly and smoothly. If, for example, the aircraft is climbing at the time of engagement of the altitude control, it will continue climbing beyond the reference altitude until the signal from the altitude device balances the signal from the pitch attitude device and the follow-up. The integrator 504 being connected across the altitude device also responds to the signal from the altitude device, and its motor operates until the inductive device driven by the motor develops a signal to balance the system. As the integrator signal increases, the attitude signal decreases, eventually becoming zero as the craft assumes a level flight attitude. At this time the altitude signal will also have become zero because the craft will be at the predetermined altitude. The signal from the inductive device of the integrator will have taken over to balance the signal from the follow-up device which had previously been balanced by the pitch attitude signal. Thus the human pilot can engage an automatic pilot system having this arrangement shortly after taking off; and without further ado he can engage the altitude control when the craft has reached a desired altitude, and the automatic pilot system will maintain the craft at this altitude.

The integrator may be similar in structure and operation to that shown in detail in Figure 4 and discussed previously. Terminals A, B of the integrator are connected across the altitude control in parallel with the elevator signal chain by way of leads 548 and 549. In response to the altitude control signal the integrator motor drives the rotor of the inductive device to develop a signal for the signal chain that is an integral of the altitude control signal. As the craft reaches the engaged altitude, the altitude control will be zero, and the signal from the inductive device of the integrator will be balancing the follow-up signal.

It will be noted that relay 550 is connected in parallel with magnetic clutch 516 of the altitude control. When the altitude control is engaged, the integrator is engaged; and when the altitude control is not engaged, the input to the integrator is interrupted by the opening of armature 551.

Figure 6 illustrates the flight path of an aircraft controlled by an automatic pilot system. Curve A shows the path of an aircraft when the integrator is operating with the altitude control and curve B shows the path of the craft when the altitude control does not include an integrator. It will be noted that when the automatic pilot system has an altitude control which includes the integrator and is engaged at an altitude of fifteen thousand feet while the craft is in a three degree dive and traveling at an airspeed of three hundred miles per hour, the craft is returned to the reference altitude. When the craft does not include the integrator arrangement, an equilibrium is reached in the automatic pilot system although the craft has not been returned to its engaged altitude.

The present novel automatic pilot system also aids the human pilot in landing operations. The present large numbers inbound and outbound aircraft present a traffic problem in airports adjacent large cities, particularly when the weather "closes in" because a longer interval of time is required for the control tower to direct the aircraft in for a landing. The control tower operator under these conditions "stacks" the inbound aircraft. In other words, each craft circles the airport following a definite pattern at an altitude assigned by the control tower operator, a different altitude being assigned to each craft to prevent collisions. The assigned altitudes of a craft are lowered in steps as an aircraft, which had arrived prior, lands so that when it is the aircraft's turn to land, the craft is at a low altitude.

With the present novel arrangement, the human pilot can at some convenient time before arriving at the airport move lever 520 on controller 113 to open switch 514 and disengage altitude control 502 from the automatic pilot system; then, by turning wheels 512 displace rotor 510 of inductive device 501 relative to stator 513 to develop an elevator signal to place the craft in a normal glide. He again moves lever 520 to close switch 514 and engage altitude control 502. As the craft glides below the engaged altitude, integrator 504 in response to the error signal of the altitude control builds up a signal in the inductive device of the integrator as discussed previously to replace the altitude error signal. The altitude error signal becomes zero as the craft returns to a level attitude at the engaged altitude and the integrator signal balances the trim signal of inductive device 501 to maintain the level attitude.

Should the aircraft be forced to circle the airport at an assigned altitude lower than the present altitude, the human pilot merely moves lever 520 to disengage the altitude control and moves lever 600 to place the output of the integrator across the input of the integrator in degenerative fashion. This is accomplished by a switch system 603 utilizing two armatures 605, 606 and four contacts 607, 608, 609 and 610.

In switch system 603, armature 605 is connected with input terminal A, and armature 606 is connected with input terminal B. Contacts 607 and 608 are connected with output terminal C, contact 609 is connected with output terminal D, and contact 610 is connected in series with armature 551. Armatures 605 and 606 are suitably insulated from each other. Thus in the normal position of the switch as shown, integrator 504, input terminals A and B will connect across the stator winding 520a of the altitude control 502 when armature 514 is moved to a closed circuit position. When lever 600 is manipulated to move armatures 605 and 606 into engagement with contacts 607 and 609 the integrator output terminals C, D will be connected with input terminals A, B to drive the motor of the integrator in a direction to make the output zero. Lever 600 and armatures 605 and 606 may be connected by any suitable conventional electrical or mechanical connection so that movement of lever 600 changes the armatures from the normal position shown in the drawing to its second position.

In operation as a landing aid, the output of terminal C, D of the integrator is fed to the input terminal A, B. In response to the input, the motor of the integrator drives the rotor relative to its associated inductive device until the output is null. As the integrator signal decreases, the balance between the pitch attitude error signal and the integrator signal is destroyed. The output of the pitch attitude inductive device 501 gradually prevails to put the craft in a glide. As the craft reaches the assigned altitude, lever 216 is moved to engage the altitude control and integrator 504 again operates in response to the altitude error to balance the attitude error to keep the craft at the engaged altitude. When the control tower assigns a lower altitude, lever 520 is moved to disengage the altitude device and lever 600 is moved to impress the output of the integrator across the input and the foregoing process repeated. By merely moving levers 520 and 600 the human pilot can maintain the assigned altitudes as he makes his pattern around the airport.

Greater flying comfort and navigation accuracy is achieved with the automatic pilot system of the present invention. When the automatic pilot system is engaged with the aircraft at any normal attitude, it will maintain the craft in a level roll attitude and on the desired heading. Any change in roll trim will be automatically corrected, and turns at any air speed will be smoothly coordinated. The altitude control can be engaged at any normal pitch attitude and the craft will be brought to a level attitude at the engaged altitude. This results in greater flying accuracy and increased efficiency of operation. Maintaining the craft at its level flight attitude at the desired altitude makes possible greater fuel economy and greater flying speed for a fixed power setting. By a simple switching action, it is possible to have the aircraft resume a climb or glide attitude after release of an altitude control; this being accomplished smoothly by reversing the action of the integrator system. This is a great aid during hold procedures when the human pilot is awaiting clearances to land and his visual and auditory facilities are taxed to the utmost.

Although but a single embodiment of the invention has been illustrated and described, various changes and modifications in the form and relative arrangment of the parts which will not appear to those skilled in the art, may be made without departing from the scope of the invention.

What is claimed is:

1. An automatic pilot system for an aircraft having a movable control surface, comprising a servomotor for moving said surface, an altitude control operatively connected with said servomotor and selectively rendered effective and ineffective, said altitude control when effective operating said servomotor to maintain said craft at a reference altitude, attitude maintaining means operatively connected with said servomotor for maintaining said craft in a predetermined attitude, means operatively connected with said attitude maintaining means for changing the attitude of the craft to an attitude other than said predetermined attitude, and integrating means operatively connected with said altitude control and rendered operative when said altitude control means is rendered ineffective for operating said servomotor to gradually change the attitude of said craft to said changed attitude.

2. An automatic pilot system for an aircraft having a movable control surface, comprising a servomotor for moving said surface, an altitude control operatively connected with said servomotor and selectively rendered effective and ineffective, said altitude control when effective operating said servomotor to maintain the craft at a reference altitude, attitude maintaining means operatively connected with said servomotor for maintaining the craft in a predetermined attitude, means operatively connected with said attitude maintaining means for changing the attitude of the craft to an attitude other than said predetermined attitude, and integrating means operatively connected with said servomotor and rendered operative when when said altitude control means is rendered effective for operating said servomotor to maintain the attitude of said craft at said predetermined attitude when the craft is at said reference altitude and rendered operative for gradually returning the craft to said other attitude when the altitude control is rendered ineffective.

3. An automatic pilot system for an aircraft having a movable control surface, comprising a servomotor for moving said surface, a positional control connected with said servomotor and selectively rendered effective and ineffective for operating said servomotor to maintain said craft in a selected position, attitude maintaining means operatively connected with said servomotor for maintaining said craft in a predetermined attitude, means operatively connected with said attitude maintaining means for changing the attitude of the craft to an attitude other than said predetermined attitude, and integrating means operatively connected to said servomotor and rendered operative when said positional control is rendered effective to operate said servomotor, said last named means maintaining the attitude of said craft at said predetermined attitude when said craft is in said selected position.

4. An automatic pilot system for an aircraft having a movable control surface, comprising a servomotor for moving said surface, a heading control connected with said servomotor and selectively rendered effective and ineffective, said heading control when effective operating said servomotor to maintain said craft on a selected heading, attitude maintaining means operatively connected with said servomotor for maintaining said craft in a predetermined attitude, means operatively associated with said attitude maintaining means and operable for changing the attitude of the craft to an attitude other than said predetermined attitude, said heading control when rendered effective developing a sustained control effect to operate the servomotor and return the craft to said predetermined attitude, and integrating means operably connected to said servomotor and responsive to said sustained control effect for developing gradually a corresponding control effect to replace said sustained heading control effect.

5. An automatic pilot system for an aircraft having a control surface selectively controlled manually and automatically, comprising a servomotor, positional reference means for operating said servomotor to maintain the craft in a desired position, attitude means for operating said surface to stabilize said craft in a predetermined attitude, means for rendering said servomotor effective on said surface for automatic control and for rendering said servomotor ineffective for manual control, means operatively associated with said attitude means for adjusting the stabilized attitude to the instant attitude of said craft at the time said servomotor is rendered effective, and means operative when the servomotor is rendered effective and responsive to said position reference means for operating said servomotor to maintain said craft at its predetermined attitude when the craft is in the desired position.

6. An automatic pilot system for an aircraft having a control surface selectively automatically and manually movable, comprising a servomotor, means for rendering said servomotor effective to move said surface for automatic operation and ineffective to move said surface for manual operation, altitude control means connected with said servomotor for operating the latter to maintain the craft at a reference altitude, attitude control means connected with said servomotor for operating the latter to stabilize said craft in a predetermined attitude, means operatively associated with said attitude control means for adjusting the stabilized attitude to the instant attitude of said craft at the time said servomotor is rendered effective, and means operative when the servomotor is rendered effective and responsive to said altitude control means for operating said servomotor to maintain the attitude of said craft at its predetermined attitude when said craft is at the reference altitude.

7. An automatic pilot system for an aircraft having a movable control surface which is selectively controlled manually and automatically, comprising a servomotor, means for rendering said servomotor effective to move said surface for automatic operation and ineffective to move said surface for manual operation, heading control means operatively connected to said servomotor for operating the latter to maintain the craft on a selected heading, attitude reference means connected with said servomotor for operating the latter to stabilize said craft in a predetermined attitude, means operatively associated with said attitude reference means for adjusting the stabilized attitude to the instant attitude of said craft at the time said servomotor is rendered effective, and means connected with said servomotor and operative when the servomotor is rendered effective and responsive to said heading control means for gradually developing a control effect for operating said servomotor to maintain said craft at its predetermined attitude when the craft is on the predetermined heading.

8. An automatic pilot system for an aircraft having a movable control surface, comprising a servomotor, means for rendering said servomotor effective and ineffective to move said surface, position reference means connected with said servomotor for operating the latter to maintain the craft in a predetermined position, means for rendering said position reference means effective and ineffective for operating said servomotor, attitude means connected with said servomotor for operating the latter to stabilize the craft in a predetermined attitude, means operatively associated with said attitude means for adjusting the stabilized attitude to the instant attitude of said craft at the time said servomotor is rendered effective, means connected with said servomotor and operative when the position reference means is rendered effective and actuated in response to said position reference means for operating said servomotor to maintain said craft at its predetermined attitude when the craft is in the predetermined position, and means connected to said reference means and operative when said position reference means is rendered ineffective for operating said servomotor to change the attitude of said craft gradually from its predetermined attitude to its attitude at the time the servomotor was rendered effective.

9. An automatic pilot system for an aircraft having a movable control surface, comprising a servomotor, means connected with the servomotor for rendering said servomotor effective and ineffective to move said surface, an altitude control connected with said servomotor for operating the latter to maintain the craft in a predetermined altitude, means operatively connected with said altitude control for rendering the latter effective and ineffective to maintain the craft at a reference altitude, attitude reference means for operating said surface to stabilize said craft in a predetermined attitude, means operatively associated with said attitude reference means for adjusting the stabilized attitude to the instant attitude of said craft at the time said servomotor is rendered effective, and means connected to said servomotor operative when the altitude control is rendered effective and operative in response to the latter for operating said servomotor to maintain the attitude at the reference attitude, said last named means including means rendered effective when said altitude control is rendered ineffective and operative to return said craft gradually to the attitude which it had when the servomotor was rendered effective.

10. An automatic pilot system for maintaining an aircraft on a predetermined course, said craft having a movable control surface thereon, comprising a servomotor for moving said surface, means for developing an attitude signal corresponding to deviation of the craft from a predetermined roll attitude, means for developing a heading signal corresponding to deviation of the craft from said predetermined course, an integrator for developing a signal corresponding to an integral of said heading signal, and means connecting said signals with said servomotor for operating the latter, said integrator including means for receiving an input corresponding to said heading signal and developing an output, motor means responsive to said output, a signal generator driven by said motor means for developing said integral signal, means driven by said motor for developing a control effect corresponding to the speed of operation of said motor, and means for feeding said control effect to said input whereby the operation of said motor and said signal generator correspond to an integral of said heading signal.

11. An automatic pilot system for maintaining at a predetermined altitude an aircraft having a movable control surface, comprising a servomotor for moving said surface, means for developing a signal corresponding to deviation of the craft from a predetermined pitch attitude, means for developing a signal to balance said first named signal at a desired pitch attitude, means for developing a signal corresponding to deviation of the craft from a predetermined altitude, an integrator responsive to said altitude signal for developing a signal corresponding to an integral of said altitude signal, and means connecting said attitude signal, said balance signal, said attitude signal, and said integral signal with said servomotor for operating the latter, said last named means including means for rendering said altitude signal ineffective and driving said integrating means to null.

12. An automatic pilot system for an aircraft having a movable control surface, comprising a servomotor for moving said surface, means for developing a reference signal corresponding to deviation of the craft from a predetermined position, means for developing an attitude signal corresponding to deviation of the craft from a predetermined attitude, means operatively connected with said servomotor for developing a follow-up signal corresponding to the displacement of said surface from a predetermined position, said reference signal, attitude signal and follow-up signal normally balancing each other, means responsive to said reference signal for developing a signal corresponding to an integral of said reference signal to replace the reference signal in balancing the attitude and follow-up signals, and means connecting said signal developing means with said servomotor for operating the latter.

13. An automatic pilot system for an aircraft, the latter having a movable control surface thereon, a servomotor for moving said surface, means for developing a heading signal corresponding to deviation of the craft from a predetermined heading, means for developing an attitude signal corresponding to deviation of the craft from a predetermined bank attitude, means associated with said servomotor for developing a follow-up signal corresponding to the displacement of said surface from a normal position, said heading signal, attitude signal and follow-up signal normally balancing each other, means responsive to said heading signal for developing a signal corresponding to a function thereof to replace the heading signal in balancing said attitude and follow-up signals, and means connecting said signal developing means with said servomotor for operating the latter.

14. An automatic pilot system for an aircraft having a movable control surface, a servomotor for moving said surface, means for developing an altitude signal corresponding to deviation of the craft from a reference altitude, means for developing an attitude signal corresponding to deviation of the craft from a predetermined pitch attitude, means operatively connected with said servomotor for developing a follow-up signal corresponding to the displacement of said surface from a normal position, said altitude signal, attitude signal, and follow-up signal normally balancing each other, means responsive to said altitude signal for developing a signal corresponding to a function thereof to replace the altitude signal in balancing the pitch attitude and follow-up signals, and means connecting said signal developing means with said servomotor for operating the latter.

15. An automatic pilot system for an aircraft having movable rudder and aileron surfaces, comprising a servomotor for each of said surfaces, reference means for developing a heading signal corresponding to deviation of the craft from a selected course, means for operating said aileron and rudder servomotors from said heading signal, and means associated with said reference means for developing a signal corresponding to an integral of said heading signal for operating at least one of said servomotors to move the associated surface to maintain said craft on said predetermined course so that said heading signal becomes zero.

16. An automatic pilot system for an aircraft, the latter having movable roll control and yaw control surfaces thereon, a servomotor for each of said surfaces, attitude means for developing a signal corresponding to deviation of the craft from a predetermined roll attitude, heading means for developing a signal corresponding to deviations of the craft from a predetermined heading, means for connecting said heading signal and said roll attitude signal in series with said roll control servomotor, means for developing a signal corresponding to the rate of turn about the yaw axis, means for connecting said heading signal and said rate of turn signal in series with said yaw control servomotor, means responsive to said heading signal for developing a signal corresponding to an integral thereof, and means for inserting said last-named signal in series with the signals to said roll control servomotor, said last named signal remaining in the system.

17. An automatic pilot system for maintaining an aircraft in a predetermined attitude and in a predetermined position, means for rendering said automatic pilot system effective and ineffective to control said craft, means for conditioning the automatic pilot system when the latter is ineffective so as to maintain the craft in its existing attitude at the time the automatic pilot system is rendered effective, said automatic pilot system including reference means for developing control effects corresponding to the error between the existing position of said craft at the time said automatic pilot system is rendered effective and said predetermined position, and integrating means responsive to said last-named control effects for developing further control effects to return said craft to said predetermined attitude and in said predetermined position.

18. An automatic pilot system for a craft having a movable control surface, comprising position reference means for developing a control signal corresponding to the deviation of said craft from a predetermined position, a servomotor for moving said surface to maintain the craft in a predetermined position, said reference means developing a continuous control signal to maintain the craft in said predetermined position when said craft is not in trim, means responsive to said control signal for developing a trim correcting signal corresponding to an integral of said control signal, and means connecting said signals to operate said servomotor by said trim signal and reduce the control signal to zero.

19. An automatic pilot system for a craft having a movable control surface, for controlling the craft about its roll axis, comprising means for developing a heading signal corresponding to the deviation of said craft from a predetermined heading, a servomotor for moving said surface to maintain the craft on a predetermined heading, means responsive to said heading signal for developing a control signal corresponding to an integral of said heading signal to operate said servomotor to trim said craft about said axis, and means connecting said signals to operate said servomotor.

20. In an automatic pilot system for maintaining an aircraft in a normal attitude, switching means for engaging and disengaging said automatic pilot system from the control of said craft, said automatic pilot system being engageable while said craft is not in said normal attitude, synchronizing means for modifying the operation of said automatic pilot system when the automatic pilot is disengaged to maintain said craft in its attitude at the time the automatic pilot is engaged, position reference means for maintaining said craft in a predetermined position, and integrating means operatively connected with said position reference means and responsive to said position reference means for controlling the automatic pilot to return said craft to said normal attitude.

21. In an automatic pilot system for a craft having a movable control surface, comprising a servomotor for moving said surface, means for engaging and disengaging said servomotor from said surface, attitude responsive means for developing an error signal corresponding to the difference in attitude of the craft from a predetermined attitude, means actuated by said servomotor for balancing said error signal when said automatic pilot system is disengaged from said surface whereby the automatic pilot system is synchronized for engagement with said control surface at any attitude of the craft, position reference means for developing an error signal corresponding to the error in position of the craft from a predetermined position, means for actuating said servomotor by said position means when said automatic pilot system is engaged with said control surface, and means responsive to said position error signal for developing a signal for actuating said servomotor to return said craft to said predetermined attitude and position.

22. An automatic control system for a craft, comprising power means for controlling the attitude of said craft, position reference means for developing a signal corresponding to deviation of said craft from a predetermined position, attitude reference means for developing a signal corresponding to the deviation of the craft from a predetermined attitude, and means for connecting both said reference means with said power means for the operation of the latter by said signals, said signals normally being in opposition, and said connecting means including means responsive to said position signal for developing a signal corresponding to an integral thereof to prevent spurious equilibrium between said position and attitude signals, and means operable on said last mentioned means when actuated for progressively eliminating said integral signal.

23. An automatic pilot system for a craft having a displaceable roll control surface, comprising power means for displacing said surface, control means for said power means including a plurality of signal developing devices connected in series to said power means, one of said signal devices being operated in response to displacement of said surface from a predetermined position to develop a corresponding signal, a second of said signal devices being operated in response to displacement of said craft from a predetermined roll attitude to develop a corresponding signal, a third of said signal devices being operated in response to displacement of the craft from a predetermined heading for developing a corresponding signal, said signals being normally balanced, and a fourth of said signal devices being operated in response to said heading signal to develop a signal corresponding to an integral thereof, thereby preventing spurious equilibrium from existing between the heading and roll attitude signals.

24. An automatic control system for a craft, comprising power means for controlling the roll condition of said craft, heading reference means for developing a signal corresponding to deviation of said craft from a predetermined heading, attitude reference means for developing a signal corresponding to the deviation of the craft from a predetermined roll attitude, and means for connecting said reference means with said power means for the operation of said power means by said signals, said signals normally being in opposition, and said connecting means including means responsive to said heading signal for developing a signal corresponding to an integral thereof, said integral signal remaining in the system thereby preventing the establishment of a spurious equilibrium between said heading and roll attitude signals.

25. An automatic control system for a craft having a movable control surface, comprising power means for moving said surface, position reference means for developing a signal corresponding to craft deviation from a predetermined position, attitude reference means for developing a signal corresponding to craft deviation from a predetermined attitude, and means connecting both said reference means to said power means and including integrating means responsive to said position signal for developing a signal corresponding to an integral thereof, said reference signals being normally in opposition and said integral signal preventing the establishment of a spurious equilibrium between said reference signals.

26. An automatic pilot system for an aircraft comprising means for developing a signal corresponding to deviation of the craft from a predetermined roll attitude, power means operable by said signal for controlling the roll attitude of said craft, said craft being subject to flying in a curvilinear path when said predetermined attitude is not level flight attitude, means responsive to deviation of said craft from a predetermined heading for developing a corresponding heading error signal and connected to said power means, said heading error signal being connected to balance said attitude signal whereby an equilibrium condition is reached such that the craft flies a linear path but at a heading that is not said predetermined heading, and integrator means responsive to said heading error signal for developing a signal corresponding to an integral thereof and connected in opposition to the attitude signal for balancing said attitude signal whereby said heading error signal returns said craft to said predetermined heading.

27. An automatic control system for an aircraft, comprising power means for controlling a surface of said craft, control means for said power means including a plurality of interconnected signal developing devices, attitude reference means responsive to deviation of the craft from a predetermined attitude for actuating one of said signal devices to develop a corresponding signal, displaceable trim means for actuating a second of said signal devices to develop a signal corresponding to said displacement, said signals operating said power means to place said craft in such an attitude as to balance said signals, position responsive means selectively rendered effective and ineffective for actuating a third of said signal devices upon displacement of said craft from the position at which said position responsive means is rendered effective to develop a corresponding signal, integrating means for actuating a fourth of said signal devices in response to said position signal to develop a signal corresponding to an integral thereof, said last named signal balancing said trim signal when said craft is in said predetermined position, and means operable for returning said integrator signal device to null.

28. An automatic control system for an aircraft, comprising power means for operating a pitch control surface of the craft, means for actuating said power means to maintain said craft in a predetermined attitude, means for actuating said power means to maintain said craft at a predetermined altitude, and means for selectively rendering effective said first or second named means, said last named means including integrating means for gradually changing the attitude of the craft.

29. An automatic pilot system for an aircraft, comprising power means for controlling the condition of said craft about its pitch axis, attitude control means for controlling said power means to place said craft in a desired glide attitude, altitude control means, means for rendering said altitude control means effective at a desired altitude to operate said power means to maintain the craft at said altitude, integrating means operable by said altitude control means to balance the effect of said attitude control means on said power means, means for rendering said altitude control means ineffective, and means for reversely operating said integrator means to unbalance the effect of said attitude control means on said power means to return said craft slowly to said desired glide attitude.

30. An automatic control system for a craft, comprising power means for controlling the pitch condition of said craft, altitude reference means for developing a signal corresponding to deviation of said craft from a predetermined altitude, attitude reference means for developing a signal corresponding to the deviation of the craft from a predetermined pitch attitude, and means for connecting both said reference means with said power means for the operation of the latter by the former, said signals normally being in opposition, and said connecting means including means responsive to said altitude signal for developing a signal corresponding to an integral thereof, said integral signal remaining in the system thereby preventing the establishment of a spurious equilibrium between said altitude and pitch attitude signals.

31. In an automatic pilot system for an aircraft having a movable control surface comprising a servomotor for moving said surface, an automatic position control connected with said servomotor for operating said servomotor to maintain said craft in a selected position and developing signals to response to an unstable condition in the aircraft, attitude maintaining means operatively connected with said servomotor for maintaining said craft in a predetermined attitude, and integrating means connected to said automatic position control and replacing in said automatic pilot the signal of said position control in reference to an unstable condition so that the position control maintains the craft in the selected position.

32. An automatic pilot system for an aircraft having a movable control surface, comprising a servomotor for moving said surface, an automatic position control connected with said servomotor for operating said servomotor to maintain said craft in a selected position, attitude maintaining means operatively connected with said servomotor for maintaining said craft in a predetermined attitude, said automatic pilot being adapted for connection to control said craft while the craft is in any attitude, said automatic position control temporarily developing a command signal when the automatic pilot is connected with the craft in an attitude other than the predetermined attitude, and integrating means connected to said automatic position control and providing a signal for said automatic pilot to replace the command signal of said position control so that the position control signal is zero when the craft is in the selected position.

33. An automatic pilot system for a craft, comprising power means for controlling said craft, position reference means for operating said power means for maintaining said craft in a predetermined position, attitude reference means for operating said power means for maintaining said craft in a predetermined attitude, said position and attitude reference means acting in opposition in the control of said power means when a change in attitude must be made to maintain a predetermined position, and further means for operating said power means and responsive to one of said reference means for gradually replacing that reference means in opposing the other reference means.

References Cited in the file of this patent

UNITED STATES PATENTS

| | | |
|---|---|---|
| 2,415,430 | Frische | Feb. 11, 1947 |
| 2,482,809 | Thompson | Sept. 27, 1949 |
| 2,611,560 | Harcum et al. | Sept. 23, 1952 |
| 2,636,699 | Jude | Apr. 28, 1953 |
| 2,646,946 | Newton | July 28, 1953 |

Notice of Adverse Decision in Interference

In Interference No. 91,747 involving Patent No. 2,945,647, C. R. Bell, Automatic pilot system, final judgment adverse to the patentee was rendered Apr. 5, 1962, as to claims 3, 4, 12, 13, 15, 16, 18, 19, 22 through 27 and 31 through 33.

[*Official Gazette May 15, 1962.*]